Nov. 20, 1973  L. S. BERNSTEIN ETAL  3,773,894
NITROGEN OXIDE CONVERSION USING REINFORCED
NICKEL-COPPER CATALYSTS
Filed July 22, 1971
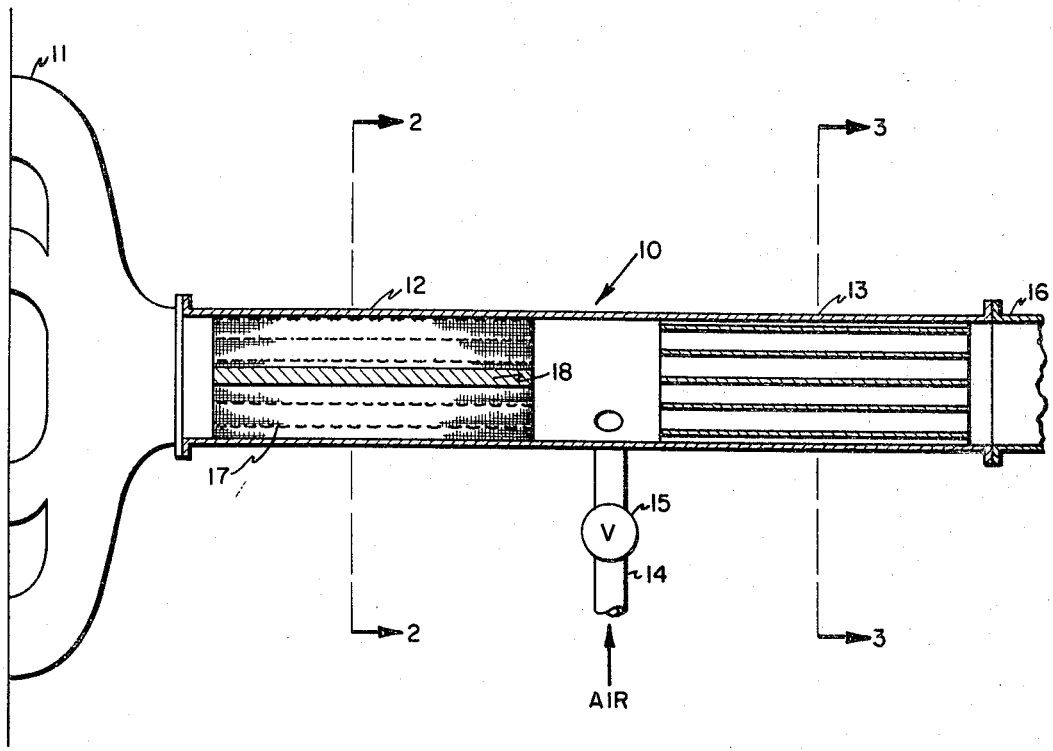
Fig. 1
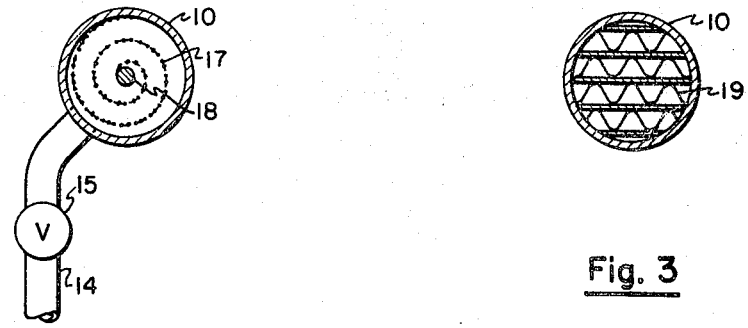
Fig. 2
Fig. 3
Leonard S. Bernstein
Eric E. Wigg        INVENTORS
Anantha K. S. Raman
BY  Louis F. Kreek, Jr.
ATTORNEY

United States Patent Office 3,773,894
Patented Nov. 20, 1973

3,773,894
NITROGEN OXIDE CONVERSION USING REINFORCED NICKEL-COPPER CATALYSTS
Leonard S. Bernstein, Iselin, Anantha K. S. Raman, Millington, and Eric E. Wigg, Westfield, N.J., assignors to Esso Research and Engineering Company
Filed July 22, 1971, Ser. No. 165,115
U.S. Cl. 423—213.5
10 Claims

ABSTRACT OF THE DISCLOSURE

Exhaust gases are contacted with a reinforced nickel-copper catalyst comprising a high temperature and oxidation resistant metallic reinforcing member and a catalytically active nickel-copper surface layer comprising about 40 to about 95% by weight of nickel and about 5 to about 60% by weight of copper.

BACKGROUND OF THE INVENTION

This invention relates to processes for converting nitrogen oxides in internal combustion engine exhaust gas streams into harmless constituents.

Exhaust gases from automotive engines constitute a major source of air pollution. Among the undesirable constituents in such exhaust gases are carbon monoxide, unburned hydrocarbons, and nitrogen oxides. Early attention to the abatement of pollution caused by automotive exhaust gas was directed primarily to the conversion of carbon monoxide and unburned hydrocarbons into innocuous substances. More recently, attention has also been directed to the reduction in nitrogen oxide levels. Nitrogen oxides are deleterious because they catalyze photochemical reactions of unburned hydrocarbons into substances which produce smog. This problem is acute in urban areas, especially where local meteorological conditions prevent the normal upward convective movement of ground level air for long periods of time.

It is kown that the nitrogen oxide level in exhaust gas can be reduced by catalytically converting nitrogen oxides into nitrogen. Unreinforced Monel, which is a nickel-copper mixture, will catalyze the removal of more than 90% of the $NO_x$ content in automotive exhaust gas under reducing conditions at temperatures above 1300° F. and at space velocities up to 100,000 v./v./hr., as reported in an article by L. S. Bernstein et al., Paper No. 710,014, Society of Automotive Engineers, Automotive Engineering Congress, Jan. 11–15, 1971. The use of unreinforced Monel as a catalyst to reduce nitrogen oxide emissions from automobile exhaust gas under net reducing conditions is also described in U.S. Pat. No. 3,565,574 to K. K. Kearby et al., issued Feb. 23, 1971. Advantages of Monel are low cost, low sensitivity to fluctuations in the composition of the exhaust gas as compared to other known nitrogen oxide reduction catalysts, and fast warm-up time. Fast warm-up time is a highly desirable characteristic inasmuch as Monel does not have appreciable catalytic activity (i.e., 50% or greater conversion) for the reduction of nitrogen oxides at temperatures below about 1100° F. Even with the most favorable placement of the catalyst, i.e., immediately downstream of the exhaust manifold, there is a short warm-up time before the catalyst bed reaches this temperature, during which time nitrogen oxides are discharged into the atmosphere. As a result, the unreinforced Monel system described in SAE Paper 710,-014 supra did not meet Federal 1975 emission standards even though significant $NO_x$ reduction was achieved. Fast warm-up times, or low heat capacity, of a mass of Monel which is sufficient to do an effective nitrogen oxide conversion job, is highly important since this characteristically minimizes the amount of nitrogen oxides discharged into the atmosphere before the catalyst is fully warm.

A significant disadvantage of unreinforced Monel as a catalyst is its relatively short life. Under vehicle tests using an emissions test procedure similar to the Federal Test Procedure (Federal Register, Vol. 33, No. 108, June 4, 1968), sintered Monel chips in a manifold reactor were found to maintain their catalytic activity in a 31,000 mile test. Mileage was accumulated on a chassis dynamometer under both simulated city-suburban and turnpike conditions. However, there was some agglomeration of the catalyst, causing some loss of surface area with an attendant slow loss of NO conversion. Furthermore, agglomeration causes increased back pressure, which is not a severe problem when the catalyst is contained in a manifold reactor, but which is a severe problem in a post-manifold reactor.

Since unreinforced Monel catalysts do undergo physical degradation under normal driving conditions during a time which is substantially less than the useful life of a car, it is important to provide Monel catalysts in a physical form which will be capable of withstanding normal auto operating conditions over a long period of time without sacrifice of the catalytic activity of Monel.

G. H. Meguerian et al., Paper No. 710,291, Society of Automotive Engineers, Automotive Engineering Congress, Jan. 11–15, 1971, discuss the use of various unsupported metallic catalysts including activated copper, Monel, stainless steel, and copper-plated stainless steel wire cloths for nitrogen oxide reduction in a CO-rich gas in a laboratory reactor at 1070° F. The unreinforced copper, unreinforced Monel, and copper-plated stainless steel wire cloths tested were all found to have better activity than the unplated stainless steel wire cloth; however, physical deterioration of the copper cloth was observed.

The use of supported metal catalysts, i.e., active catalyst metals on ceramic supports, as catalysts for the conversion of nitrogen oxide in engine exhaust gas has been described in numerous references. Such references include Meguerian et al., SAE Paper 710,291, supra, and U.S. Pat. Nos. 3,370,914 and 3,397,034. Supports can be characterized as either high surface area or low surface area. High surface area supports have the disadvantage of short life under normal auto operating conditions. See, for example, R. M. Yarrington et al., Journal of the Air Pollution Control Association, Vol. 20, No. 6, pp. 398–401, June 1970. On the other hand, longer lived catalysts comprising a catalytically active surface layer on a low surface area ceramic support can be prepared. Disadvantages of low surface area ceramic supported catalysts are that it is relatively difficult to fabricate ceramic supports into desirable low pressure drop shapes and to provide essentially uniform coatings of catalyst thereon. For example, a honeycomb is a highly desirable catalyst shape for an automotive exhaust gas reactor from the standpoint of low pressure drop, but it is very difficult to provide a substantially uniform catalyst coating thereon. On the other hand, ceramic spheres, which can be uniformly coated with comparative ease, are undesirable because of their relatively high pressure drop and attrition.

Supported catalysts have also been used to remove nitrogen oxides under reducing conditions from stack gases emitted by stationary sources, such as nitric acid plants. U.S. Pat. No. 2,924,504, for example, describes the use of nickel, copper, and mixtures thereof supported on a refractory carrier in this service. Design space velocities are somewhat lower than those considered desirable in automobile operation at high speeds.

There is also a considerable body of art on the use of various oxidation catalysts to remove carbon monoxide and/or unburned hydrocarbons from automobile engine exhaust under oxidizing conditions. See, for example, U.S.

Pat. Nos. 2,071,119 (unsupported Monel), 3,257,163 (various catalysts and supports), and 3,397,034, supra. Some catalysts are suitable both as oxidizing catalysts and as reducing catalysts, although by no means is this always the case. In all cases the optimum reaction conditions are different; nitrogen oxides are removed most effectively under reducing conditions, while carbon monoxide and unburned hydrocarbons are removed most effectively under oxidizing conditions. Removal of carbon monoxide and hydrocarbons from engine exhaust received attention at a much earlier date than removal of nitrogen oxides, which has been recognized as a problem only in comparatively recent years.

Although numerous suggestions have been made in the art for the removal of nitrogen oxides from automobile engine exhaust gases, there exists a need for a low-cost catalyst which is both durable and highly effective for nitrogen oxide removal from exhaust gas under conditions prevailing in an automobile.

SUMMARY OF THE INVENTION

According to the present invention, automotive exhaust gas is contacted under net reducing conditions with a catalyst comprising a metallic reinforcing member and a catalytically active surface layer comprising about 40% to about 95% by weight of nickel and about 5% to about 60% by weight of copper.

DRAWINGS

FIG. 1 is a sectional view of a portion of an automobile engine exhaust system embodying the catalyst of this invention;

FIG. 2 is a cross-sectional view taken along line 2—2 of FIG. 1; and

FIG. 3 is a cross-sectional view taken along line 3—3 of FIG. 1.

DESCRIPTION OF THE PREFERRED EMBODIMENT

The catalysts of this invention are all metal composite structures comprising a metallic base or reinforcing member and a catalytically active surface layer which is also metallic. The catalyst can be in any physical form which presents a substantial surface area, i.e., in the form of particles such as spheres, pellets, or saddles, or in the form of an integral structure such a a honeycomb, screen or expanded metal mesh. Preferred catalysts are monolithic structures, such as screens, expanded metal mesh and honeycombs.

Reinforced nickel-copper catalysts according to the present invention have a major advantage over bulk or unreinforced Monel catalysts described above. This advantage is high temperature strength retention for a considerably longer time, which gives much longer catalyst life. Laboratory and dynamometer tests indicate that the expected life of a nickel or alloy reinforced nickel-copper catalyst according to this invention should be considerably longer than the life of an unreinforced nickel-copper catalyst having the same physical form. As a result of this improved high temperature strength retention, reinforced nickel-copper catalysts of this invention can be made into durable monolithic structures such as screens and honeycombs having a low catalyst mass. Similar structures of unreinforced nickel-copper alloys have very short lifetimes. A low catalyst mass is desirable because it results in a fast warm-up time and therefore low nitrogen oxide emissions over the course of a standard test cycle. When the catalyst herein is used as the first stage catalyst in a dual catalyst system, a low mass catalyst also promotes faster warm-up of the second stage or oxidation catalyst.

The base or reinforcing member is a metal or alloy which retains its strength and oxidation resistance at temperatures of at least 1800° F., and one to which a catalytically active layer of nickel-copper alloy can be adherently joined or bonded. Strength at 1800° F. is required because under normal high speed, high load operating conditions, catalysts placed immediately downstream of the exhaust manifold can be exposed to temperatures exceeding 1700° F. Oxidation resistance is required because even when an automotive engine is operated at the richer than stoichiometric air-fuel ratios required to maintain $NO_x$ reduction activity, it produces an exhaust which contains oxygen. Furthermore, if the engine is operated at just slightly richer than stoichiometric air-fuel ratio, at an average air-fuel ratio of 14 pounds air per pound of fuel, for example, to maintain maximum fuel economy consistent with good nitrogen oxide reduction activity, a normal carburetor will periodically expose the catalyst to net oxidizing conditions during operating transients.

A partial list of alloys which meet the above criteria is presented in the "Standard Handbook for Mechanical Engineers," 7th edition, page 6–111, McGraw-Hill Book Co., 1967. Suitable alloys typically contain at least 10% by weight of chromium with the balance consisting predominantly of nickel and/or iron. Usually the alloy contains no more than about 50% by weight of chromium. Alloys having greater amounts of chromium are usually more difficult to fabricate although they have good heat and oxidation resistance. Satisfactory alloys include Nichrome (60% Ni, 15% Cr, 1.4% Si, 0.04% C, balance Fe), Nichrome V (20% Cr, 80% Ni), Inconel (13% Cr, 79% Ni, 8% Fe) and Type 310 stainless steel (25% Cr, 20% Ni, balance Fe). The alloy compositions in this paragraph are nominal compositions and are expressed in percent by weight.

The catalytically active surface layer is an intimate nickel-copper mixture or alloy comprising about 40 to about 95% by weight of nickel and about 5 to about 60% by weight of copper. Preferably, the surface layer composition is a composition consisting essentially of about 5 to about 60% by weight of copper, no more than about 3% by weight of impurities, balance nickel. Commercial "Monel" alloys sold by International Nickel Company, New York, N.Y., have compositions which are excellent for the surface compositions of the catalytic surface layer herein. One composition is that of "Monel 400," which typically contains about 66.5% by weight of nickel, 31.5% by weight of copper, and about 2% by weight of impurities. Another highly desirable nickel-copper mixture composition is a low manganese material having the composition designated as "Monel 404," containing about 54.5% of nickel, 45% of copper, balance impurities, with no more than about 0.10% of manganese.

Nickel-copper mixtures as above described are preferred over either nickel or copper alone as the catalyst. The nickel-copper mixtures show higher $NO_x$ conversion activity than pure copper at space velocities of about 100,000 v./v./hr. and higher, which are encountered in a well-designed catalytic reactor during moderate and high speed operation of an automobile. A similar observation with respect to bulk nickel-copper alloys and mixtures was made in SAE Paper No. 710,014, supra. Nickel-copper mixtures herein are superior to nickel alone as the catalyst because the mixtures recover catalytic activity more quickly than pure nickel after excursions into the oxidizing region.

The catalysts of this invention can be made by known methods such as vapor deposition, electrodeposition, sputtering, hot rolling, or metal cladding. Suitable methods are described, for example, in "The Making, Shaping and Treating of Steel," 8th Edition, United States Steel Corporation, Pittsburgh, Pa., 1964, and do not constitute part of the present invention.

The catalysts of this invention are subject to severe corrosion by lead and functon best on unleaded fuel. These catalysts reduce nitrogen oxide under net reducing conditions, i.e., when the exhaust gas has a quantity of reducing components (e.g., carbon monoxide, hydrogen and unburned hydrocarbons) which is stoichiometrically in excess of the quantity of oxidizing components (e.g., oxygen and nitric oxide). These catalysts show little activity at temperatures below about 900° F., achieve about a 50% conversion of nitrogen oxides at temperatures above about 1100° F., and achieve better than 90% conversion of nitrogen oxides at temperatures over about 1300° F. These conversions are achieved at high space velocities, e.g., about 100,000 v./v./hr. The catalysts of this invention show long catalyst life with much less physical deterioration than unsupported nickel-copper catalysts such as "Monel" under similar conditions of operation.

Nitrogen oxides in the exhaust gas are converted predominantly to nitrogen over a wide range of air-fuel ratios in the net reducing range (i.e., air-fuel ratios less than stoichiometric). Some $NO_x$ is reduced to ammonia, which is undesirable. Ammonia formation is greatest at very rich air-fuel ratios, and can be held down to acceptable levels by maintaining an average air-fuel ratio which is slightly richer than stoichiometric.

The catalysts of this invention are used most advantageously in a two-stage reactor system in which the catalyst therein is the catalyst in the first stage of the reactor. Such two-stage systems are known in the art. The exhaust gases are passed into the first stage containing the catalyst of this invention without the addition of any external air and under net reducing conditions. Secondary air is then added to the effluent of the first stage, and the exhaust gas mixture, which is now net oxidizing, is oxidized in the second stage to reduce the amount of carbon monoxide and hydrocarbons therein. Ammonia will be oxidized to nitric oxide, but nitrogen is unaffected. The second stage may be either a catalytic or a noncatalytic stage as desired.

A preferred catalytic pollution control apparatus for automobile for converting $NO_x$ in the hot exhaust gas containing a catalyst according to this invention is shown in FIGS. 1–3.

Referring to FIGS. 1–3, the pollution control apparatus comprises a catalytic reactor 10 which is placed in an automobile engine exhaust system immediately downstream of an exhaust manifold 11. This position, frequently referred to in the art as the "post-manifold" position, is preferred over other positions because it provides faster warm-up time. The preferred reactor 10 is a two-stage reactor having a first stage 12 where nitrogen oxides are reduced without the addition of external air, and a second stage 13 where carbon monoxide and unburned hydrocarbons are oxidized with external air admission line 14 having a check valve 15 to prevent back flow of exhaust gas is provided between the two stages. An air pump (not shown) supplies air to this line 14. No external air is added to the exhaust gas stream prior to its entry into the first stage 12 of the reactor 10. Purified exhaust gases of reduced $NO_x$, CO and hydrocarbon content flow from the reactor 10 into an exhaust pipe 16, which may be attached to a conventional muffler (not shown).

The first stage 12 of reactor 10 contains a catalyst according to this invention. This catalyst, as previously explained, comprises a metallic reinforcing layer and a catalytic surface layer comprising about 40% to about 95% by weight of nickel and about 5% to about 60% by weight of copper. This catalyst may be in various physical forms, preferably monolithic structures such as screens which can be retained in place inside the reactor 10. In a preferred embodiment, illustrated in FIG. 1, catalyst is in the form of a wire mesh or screen 17 which is spirally wound around an imperforate core 18. The mesh size is usually 8 to 100 mesh and preferably 10 to 40 mesh.

The wire has a base of the reinforcing metal or alloy, e.g., stainless steel, and a catalytic surface layer of nickel and copper as aforedescribed. The thickness of the surface layer does not appear to be crtical provided it is at least about 1000 atomic diameters of Ni and Cu. The diameter of the base is not critical provided it is sufficient to provide a durable structure. This structure provides excellent contact between the catalyst surface layer and the exhaust gas, so that high conversions of $NO_x$ are achieved at high space velocities, which may go up to 150,000 v./v./hr. or even higher, depending on engine speed, using a low catalyst mass.

The second stage 13 of reactor 10 preferably contains an oxidation catalyst which is capable of oxidizing carbon monoxide and hydrocarbons in engine exhaust to harmless substances. Known catalysts for this purpose may be used. A preferred catalyst is platinum on a cordierite honeycomb 19, sold byEngelhard Minerals and Chemicals Corporation, Newark, N.J., under the designation "PTX."

While the two reaction stages 12 and 13 are housed in a single reactor in the preferred embodiment illustrated, separate reactors for the reduction catalyst of this invention and the oxidation catalyst can be used if desired.

This invention will now be described with reference to the examples which follow.

EXAMPLE 1

A Monel catalyst reinforced with Type 310 stainless steel was prepared by welding 0.025 inch thick "Monel 400" sheets to either side of a 0.100 inch thick Type 310 stainless steel slab. The resulting composite material was hot rolled to 0.030 inch total thickness. The 0.030 inch material was slit into one inch wide strips and stamped into a shape referred to as square saddles. For comparison, unreinforced square saddles of "Monel 400," 0.031 inch thick, were also tested. Square saddles are described in SAE Paper No. 710,014, supra.

The durability of this catalyst was tested in an engine dynamometer test. The Monel reinforced with Type 310 stainless steel square saddles was loaded into a reactor mounted on the right bank of a 302 CID V–8 Ford engine. Square saddles stamped from 0.031 inch thick unreinforced "Monel 400" were loaded into a reactor mounted on the left bank of this engine. Catalyst bed dimensions were 5 inch diameter x 4 inches high. The engine was operated at speed and load conditions necessary to maintain 1600–1650° F. catalyst temperature at an air-fuel ratio of approximately 14 pounds air per pound fuel. Unleaded "Indolene H.O. Motor Fuel III," a commercial full boiling range motor fuel (typical boiling range 81°–381° F.) having a typical RON (research octane number) clear 97.2 and marketed by American Oil Company, Chicago, Illinois, was used as the motor fuel.

The engine dynamometer test was designed for maximum convenience in evaluating durability, and no attempt was made to maximize $NO_x$ conversion. Thus the reactor design was chosen to allow ease of mounting in the engine exhaust system. Its height-to-diameter ratio of 0.8 is too small to provide the most efficient gas-solid contacting. In addition, the use of a saddle shape allows ready determination of strength maintenance, but again is not optimum of gas-solid contacting. Therefore, in order to determine the true $NO_x$ conversion activity of the Monel surface at various stages of the durability test, it is necessary to periodically remove small batches of saddles. These are cut into small chips and tested in a laboratory reactor of suitable geometry to provide satisfactory gas-solid contacting.

The strength of the saddles was determined by measuring the amount of force necessary to crush the saddles. The reinforced Monel showed excellent strength maintenance. Appreciable differences in strength developed after only 88 hours of operation, equivalent to approximately 5000 miles of vehicle operation.

TABLE I

| | Average crush strength of 25 saddles | |
|---|---|---|
| | Monel reinforced with type 310 stainless steel (total thickness: .030″), lbs. | .031″ unreinforced Monel 400, lbs. |
| Hours on test: | | |
| 0 | 276 | 269 |
| 88 | 233 | 172 |
| 201 | 263 | 82 |
| 315 | 257 | ¹ 58 |

¹ This value appears to be high. The catalyst was so highly agglomerated that a representative sample could not be obtained.

Another measure of the durability of the Monel reinforced with Type 310 stainless steel catalyst is its slower rate of back pressure buildup.

TABLE II

| | Pressure drop through catalyst bed | |
|---|---|---|
| | Monel reinforced with type 310 stainless steel, in. of Hg | Unreinforced Monel 400, in. of Hg |
| Hours on test: | | |
| 0 | 1.0 | 0.9 |
| 135 | 1.6 | 1.6 |
| 201 | 1.7 | 2.0 |
| 244 | 2.0 | 2.8 |
| 268 | 2.2 | 3.2 |
| 292 | 2.4 | 3.6 |
| 315 | 2.4 | 3.8 |

Reinforcing Monel with Type 310 stainless steel had no adverse effect on its catalytic activity. A sample of the reinforced catalyst which had been exposed to 201 hours of engine operation was cut up and tested for catalytic activity at 1300° F. and 100,000 v./v./hr. space velocity in a laboratory test unit. Its activity, compared with the best previously obtained activity for unreinforced Monel, is shown below.

TABLE III

Feed gas: 1.6% CO, 0.5% $H_2$, 1,500 p.p.m. NO 500 p.p.m. $C_6$, 12% $CO_2$, 12% $H_2O$, $O_2$ as noted, balance $N_2$

| | Percent NO conversion over Monel reinforced with type 310 stainless steel | Percent NO conversion over unreinforced Monel |
|---|---|---|
| Percent $O_2$ in feed: | | |
| 0 | 99 | 100 |
| 0.5 | 98 | 99 |
| 0.8 | 96 | 97 |
| 1.0 | 86 | 83 |
| 1.2 | 68 | 62 |
| 1.4 | 39 | 46 |

EXAMPLE 2

A Monel catalyst reinforced with Nichrome (nominal composition: 60% Ni, 15% Cr, 1.4% Si, 0.04%, balance Fe, all percentages by weight) was prepared by roll compacting to 0.075 inch thickness a minus 50 mesh 70% Ni-30% Cu powder over a Nichrome wire screen which had been rolled from 0.032 inch thickness to 0.020 thickness. This material was taken through a series of sintering and rolling steps to reduce its thickness to 0.035 inch. It was annealed and stamped into square saddles. The saddles were tested in the engine dynamometer facility described in Example 1 at a steady state space velocity of approximately 200,000 v./v./hr. At the end of 440 hours, the saddles retained their shape and were not deformed as occurs with unreinforced Monel saddles of similar thickness. The average crush strength of these saddles was 64.8 pounds. Activity was comparable to that of unreinforced Monel.

What is claimed is:

1. A process for reducing the nitrogen oxide content of a net reducing exhaust gas stream from an internal combustion engine which comprises contacting said stream with a catalyst consisting essentially of a metallic reinforcing member which retains its strength and oxidation resistance at a temperature of at least 1800° F. and a catalytic surface layer comprising about 40 to about 95% by weight of nickel and about 5 to about 60% by weight of copper.

2. A process according to claim 1 in which said reinforcing member is an alloy containing at least one member of the group consisting of iron and nickel, and at least about 10% by weight of chromium.

3. A process according to claim 2 in which said alloy contains from about 10% to about 50% by weight of chromium.

4. A process according to claim 1 in which said catalytic surface layer is a composition consisting essentially of nickel and copper and having a manganese content not greater than about 0.10% by weight.

5. In a catalytic pollution control apparatus for an automotive vehicle for converting $NO_x$ in the hot exhaust gas, a catalyst consisting essentially of a metallic reinforcing member which retains its strength and oxidation resistance at a temperature of at least 1800° F. and a catalytic surface layer comprising about 40 to about 95% by weight of nickel and about 5 to about 60% by weight of copper.

6. Apparatus according to claim 5 comprising a catalytic reactor containing said catalyst.

7. Apparatus according to claim 6 wherein said catalytic reactor is located immediately downstream of the exhaust gas manifold.

8. Apparatus according to claim 5 in which said reinforcing member is an alloy containing at least one member of the group consisting of iron and nickel, and at least about 10% by weight of chromium.

9. Apparatus according to claim 8 in which said alloy contains from about 10% to about 50% by weight of chromium.

10. Apparatus according to claim 5 in which said catalytic surface layer is a composition consisting essentially of nickel and copper and having a manganese content not greater than about 0.10% by weight.

References Cited

UNITED STATES PATENTS

| 3,247,665 | 4/1966 | Behrens | 60—30 |
| 3,316,057 | 4/1967 | Howr et al. | 23—2 |
| 3,565,574 | 2/1971 | Kearby et al. | 23—2 |
| 2,699,989 | 1/1955 | Maudry | 23—2 X |
| 3,492,098 | 1/1970 | De Palma et al. | 23—288 |
| 3,428,472 | 2/1969 | Shimose et al. | 117—130 |
| 3,208,131 | 9/1965 | Ruff et al. | 23—288 |

FOREIGN PATENTS

| 354,692 | 2/1960 | Great Britain | 23—2 |

GEORGE O. PETERS, Primary Examiner

U.S. Cl. X.R.

23—288; 252—474